US007200816B2

(12) United States Patent
Falk et al.

(10) Patent No.: US 7,200,816 B2
(45) Date of Patent: Apr. 3, 2007

(54) METHOD AND SYSTEM FOR AUTOMATING CREATION OF MULTIPLE STYLESHEET FORMATS USING AN INTEGRATED VISUAL DESIGN ENVIRONMENT

(75) Inventors: Alexander Falk, Marblehead, MA (US); Vladislav Gavrielov, Vienna (AU)

(73) Assignee: Altova, GmbH, Vienna (AT)

( * ) Notice: Subject to any disclaimer, the term of this patent is extended or adjusted under 35 U.S.C. 154(b) by 132 days.

(21) Appl. No.: 10/761,578

(22) Filed: Jan. 21, 2004

(65) Prior Publication Data
US 2005/0160359 A1 Jul. 21, 2005

(51) Int. Cl.
*G06F 3/00* (2006.01)
*G06F 3/01* (2006.01)

(52) U.S. Cl. .................. 715/762; 715/513; 715/517; 717/105

(58) Field of Classification Search ............. 715/517, 715/522; 717/105
See application file for complete search history.

(56) References Cited

U.S. PATENT DOCUMENTS

| 6,006,242 | A  | * | 12/1999 | Poole et al. ............. 715/531 |
| 6,507,857 | B1 | * | 1/2003  | Yalcinalp ................. 715/513 |
| 6,540,142 | B1 |   | 4/2003  | Alleshouse |
| 6,643,652 | B2 |   | 11/2003 | Helgeson et al. |
| 6,675,354 | B1 |   | 1/2004  | Claussen et al. |
| 6,772,408 | B1 | * | 8/2004  | Velonis et al. ............ 717/100 |
| 6,799,299 | B1 | * | 9/2004  | Li et al. ................... 715/513 |
| 6,901,403 | B1 | * | 5/2005  | Bata et al. ............... 707/101 |
| 2002/0147748 | A1 |   | 10/2002 | Huang et al. |
| 2003/0037076 | A1 | * | 2/2003  | Bravery et al. ........... 707/517 |
| 2003/0120671 | A1 |   | 6/2003  | Kim et al. |
| 2003/0120686 | A1 |   | 6/2003  | Kim et al. |
| 2003/0167445 | A1 |   | 9/2003  | Su et al. |
| 2003/0177449 | A1 | * | 9/2003  | Rose ....................... 715/530 |
| 2003/0225829 | A1 | * | 12/2003 | Pena et al. ............... 709/203 |
| 2003/0237046 | A1 |   | 12/2003 | Parker et al. |
| 2004/0010754 | A1 | * | 1/2004  | Jones ...................... 715/513 |
| 2004/0046789 | A1 | * | 3/2004  | Inanoria .................. 345/748 |
| 2004/0111670 | A1 | * | 6/2004  | Sasakuma et al. ........ 715/513 |

(Continued)

FOREIGN PATENT DOCUMENTS

KR 2002057709 * 1/2001

OTHER PUBLICATIONS

Sonic Software et al. "Sonic Stylus Studio Data sheet" Dec. 17, 2003 http://web.archive.org/web/20031217022908/www.sonicsoftware.com/products/sonic_stylus.html pp. 1-12.*

(Continued)

*Primary Examiner*—Weilun Lo
*Assistant Examiner*—Steven Theriault
(74) *Attorney, Agent, or Firm*—Holland & Knight LLP (57) ABSTRACT

A unified visual design environment in a data processing system to enable automatic generation of a plurality of stylesheets for different output formats. The invention enables support for visual editing and generation of extensible Stylesheet Language (XSL) code, such as XSL code that enables XML content to be rendered into an HTML file, XSL:FO code that enables XML content to be rendered into a PDF file, and the like. With a single stylesheet design, developers can preview an output of a stylesheet transformation in one of several different formats, e.g., HTML, PDF, or others.

20 Claims, 6 Drawing Sheets

U.S. PATENT DOCUMENTS

| | | | |
|---|---|---|---|
| 2004/0117769 A1* | 6/2004 | Lauzon et al. | 717/125 |
| 2004/0153968 A1* | 8/2004 | Ching et al. | 715/513 |
| 2004/0205571 A1* | 10/2004 | Adler et al. | 715/513 |
| 2004/0205605 A1* | 10/2004 | Adler et al. | 715/517 |
| 2004/0268238 A1* | 12/2004 | Liu et al. | 715/513 |
| 2005/0066273 A1* | 3/2005 | Zacky | 715/517 |
| 2005/0132284 A1* | 6/2005 | Lloyd et al. | 715/517 |
| 2005/0150953 A1* | 7/2005 | Alleshouse | 235/432 |

OTHER PUBLICATIONS

Vikram Goyal et al. "XML to PDF? of, FOP it." Oct. 16, 2002 http://www.onjava.com/lpt/a/2698.*

Kevin Williams et al. "XML for Data: XSLT 2.0 an early look" Jul. 1, 2002. http://www.128.ibm.com/developerworks/xml/library/x-xdxslt20.html.*

Alotva et al. "Sytlevision5 User and Reference Manual" 2003 pp. 1-489.*

Altova Inc. et al. "Altova Software Archive" May 4, 2006 pp. 1-9.*

Altova Inc. & Altova GMBH, XSLT On-line Manual, 1998-2001, pp. 1-49.

Altova Inc. & Altova GMBH, Document Editor On-line Manual, 1998-2001, pp. 1-25.

"XSL Transformation (XSLT) Version 2.0", W3C Working Draft; Apr. 30, 2002, pp. 1-246 (http://www.w3.org/TR/2002/WD-xslt20-20020430/).

"Cascading Style Sheets", level 2, CSS2 Specification W3C Recommendation, Apr. 14, 1998, XPP-002238711, pp. 1-3.

"Peek Into the Future of XSLT 2.0", Charles White, Mar. 4, 2003, http://www.devx.com/xml/Article/11147, pp. 1-11.

"What's New in XSLT 2.0", Evan Lenz, XML.com, Apr. 10, 2002, pp. 1-6.

Stylevision User and Reference Manual, version 5, release 1, published Sep. 16, 2002.

Stylevision User and Reference Manual, version 5, release 2, published Oct. 30, 2002.

Stylevision User and Reference Manual, version 5, release 3, published Jan. 27, 2003.

Stylevision User and Reference Manual, version 5, release 4, published Apr. 8, 2003.

XMLSpy User and Reference Manual, version 5, release 1, published Sep. 16, 2002.

XMLSpy User and Reference Manual, version 5, release 2, published Oct. 30, 2002.

XMLSpy User and Reference Manual, version 5, release 3, published Jan. 27, 2003.

XMLSpy User and Reference Manual, version 5, release 4, published Apr. 8, 2003.

Ono et al "XSLT Stylesheet Generation by Example with WYSIWYG Editing" Proceedings of the 2002 Symposium on Applications and the Internet (SAINT'02).

Sonic Software "Sonic Stylus Studio Datasheet" Oct. 25, 2003 http://web.archive.org/web/20031025064922/www.sonicsoftware.com/products/docs/stylus_studio.pdf.

B. Naylor, S. Watt "Meta-Stylesheets for the Conversion of Mathematical Documents into Multiple Forms" Dec. 23, 2001.

* cited by examiner

METHOD AND SYSTEM FOR AUTOMATING CREATION OF MULTIPLE STYLESHEET FORMATS USING AN INTEGRATED VISUAL DESIGN ENVIRONMENT

BACKGROUND OF THE INVENTION

1. Technical Field

The present invention relates generally to data integration technologies and, in particular, to techniques for authoring stylesheets in an XML application development environment.

2. Description of the Related Art

Organizations today are realizing substantial business efficiencies in the development of data intense, connected, software applications that provide seamless access to database systems within large corporations, as well as externally linking business partners and customers alike. Such distributed and integrated data systems are a necessary requirement for realizing and benefiting from automated business processes, yet this goal has proven to be elusive in real world deployments for a number of reasons including the myriad of different database systems and programming languages involved in integrating today's enterprise back-end systems.

Extensible Markup Language (XML) technologies are ideally suited to solve advanced data integration challenges, because they are both platform and programming language neutral, inherently transformable, easily stored and searched, and already in a format that is easily transmittable to remote processes via XML-based Web services technologies. XML is a subset of SGML (the Structured Generalized Markup Language) that has been defined by the World Wide Web Consortium (W3C) and has a goal to enable generic SGML to be served, received and processed on the Web. XML is a clearly defined way to structure, describe, and interchange data. XML technologies offer the most flexible framework for solving advanced data integration applications. They do not, however, encompass the entire solution, in that a particular solution must still be implemented. Thus, XML technologies are not a standalone replacement technology, but rather a complementary enabling technology, which when bound to a particular programming language and database provide an elegant solution to a different problem.

There are a number of ancillary technologies associated with XML. The extensible Stylesheet Language (XSL) consists of, among other things, the extensible Stylesheet Language Transformation (XSLT), a standardized language for transforming XML documents to simple output forms such as HTML or WML, and the extensible Stylesheet Language Formatting Objects (XSL:FO), an XML-based language for expressing advanced document layouts, employed by many popular formats including PDF and PostScript files. XSL decouples the contents of a document from its style (i.e., the document's layout and formatting). This allows a designer to either change the document's style without affecting the content, or to change the content while preserving the style. The transformation process from one data format to another involves processing an XML document and an XSL stylesheet in an XSL processor, which results in the generation of a new output document. An example of altering a document's style while preserving the content is multi-channel publishing. Using XSL, a single source of XML content can be published into a wide variety of customized output media, such as HTML, WML, PostScript, PDF, or any other information format, through the application of a stylesheet. An example of changing a document's content while preserving the style is internationalization and localization of resource files. A corporate website could internationalize its content in different languages such as German and Japanese, simply by translating the XML content and leaving the stylesheets unchanged.

A given output format, such as HTML, PDF, PostScript, or the like, has its own associated XSLT stylesheet. Thus, for a given XML document, a first XSLT stylesheet must be created to generate HTML, a second XSLT stylesheet must be created to generate PDF, a third XSLT stylesheet must be created to generate WML, and so forth. Because of the need to have a unique stylesheet for every output format, authoring XSLT stylesheets is an extremely complex and time-consuming task. Many designers have little if any experience in this process, and a single stylesheet error often prevents the generation of any useful output.

Visual data mapping tools have been created to accelerate the implementation of XSLT stylesheets. These tools, however, are only useful to author a particular stylesheet format (e.g., XSLT for transforming XML to HTML). There remains a long felt need in the art for solutions that can be used to create stylesheets for multiple output formats. The present invention addresses this need.

BRIEF SUMMARY OF THE INVENTION

It is a primary object of the present invention to provide a unified visual design environment in a data processing system to enable automatic generation of a plurality of stylesheets for different output formats.

It is another more specific object of the invention to provide a system for automating writing of multiple different types of stylesheets through an integrated visual design environment that executes in a graphical user interface (GUI) of a data processing system.

It is another object of the invention to provide for a single visual design environment in which a designer can create stylesheets through an intuitive user interface.

A more specific object of the invention it to enable support for visual editing and generation of extensible Stylesheet Language (XSL) code, such as XSL code that enables XML content to be rendered into an HTML file, XSL:FO code that enables XML content to be rendered into a PDF file, and the like. With a single stylesheet design, developers can preview an output of a stylesheet transformation in one of several different formats, e.g., HTML, PDF, or others.

In an embodiment, a method of and system for automatic writing of complex stylesheets preferably using an intuitive drag-and-drop user interface. By simply opening an existing structured data source (e.g., an XML document, an XML Schema, DTD, relational database, EDI document, a Web service, or the like), an appropriate content model appears in a given display panel, preferably in a tree-like controller. The designer then selects an element or attribute that he or she desires to appear in an output and drags it from the given display panel to a main output window. The designer then specifies how he or she would like the new node to be handled (e.g., as a new paragraph, image, table, or the like). A stylesheet, sometimes referred to as a "meta stylesheet," is automatically generated (or is generated as the designer positions elements and attributes in the main output window). Typically, the meta stylesheet is maintained as an internal data representation, although it may be displayable if desired. According to the invention, two or more stylesheets are generated from the meta stylesheet and from within the integrated visual design environment, with each of the stylesheets being useful for generating the document being designed in a given output format. Thus, in a representative example, the two or more stylesheets include a first XSLT stylesheet for transforming an XML document into HTML, and a second XSLT stylesheet to facilitate transformation of the XML document into PDF via XSL:FO. Each of the stylesheets may be automatically previewed in the GUI by simply selecting a preview tab. Another control tab may be used to preview the output document rendered through the respective stylesheet.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF AN EMBODIMENT

Figure 1:
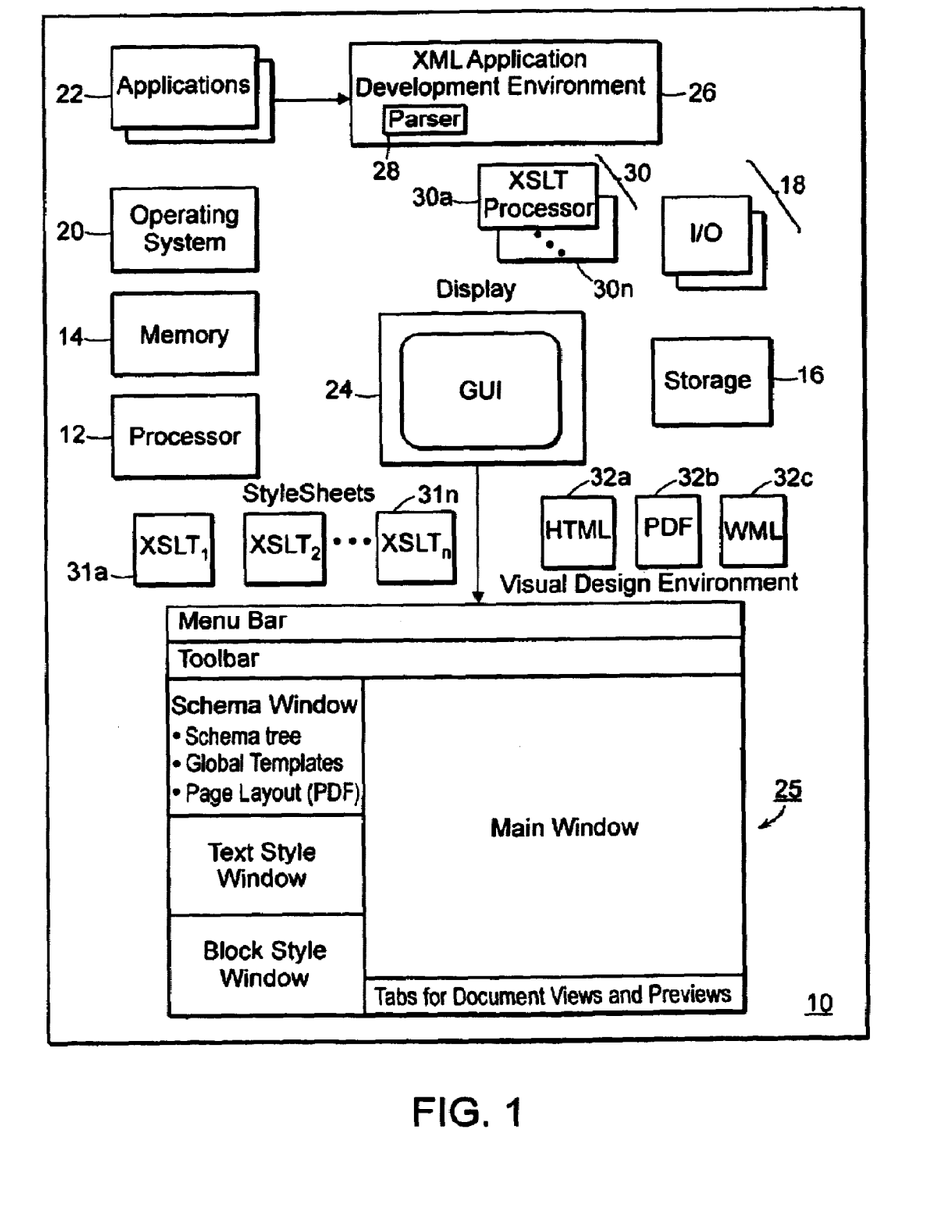
FIG. 1 is a data processing system that includes the visual design environment of the present invention.

The present invention is implemented in a data processing system such as shown in FIG. 1. Typically, a data processing system 10 is a computer having one or more processors 12, suitable memory 14 and storage devices 16, input/output devices 18, an operating system 20, and one or more applications 22. One input device is a display 24 that supports a window-based graphical user interface (GUI). The data processing system includes suitable hardware and software components (not shown) to facilitate connectivity of the machine to the public Internet, a private intranet or other computer network. In a representative embodiment, the data processing system 10 is a Pentium-based personal computer executing a suitable operating system such as Windows 98, NT, W2K, or XP. Of course, other processor and operating system platforms may also be used. Preferably, the data processing system also includes an XML application development environment 26. A representative XML application development environment is xmlspy® from Altova, Inc. An XML development environment such as Altova xmlspy® facilitates the design, editing and debugging of enterprise-class applications involving XML, XML Schema, XSL/XSLT, SOAP, WSDL, and Web services technologies. The XML development environment typically includes an XML parser 28, and a set of one or more XSLT processors 30a–n. A given XSLT processor may be provided as a native application within the XML development environment or as a downloadable component.

According to the present invention, the XML development environment includes given software code (a set of instructions) for use in creating an integrated visual design environment (VDE) 25 in which multiple XSLT stylesheets 31a–n are generated. The visual design environment may be an adjunct to the data processing system GUI, or native to the GUI. In the past, it has not been possible to concurrently create different stylesheet formats within the same visual design space. The present invention solves this problem by providing the integrated visual design environment that is described below. If the XML development environment includes suitable XSLT processors, then the designer can also preview an output document using the generated stylesheet(s). Thus, in a representative embodiment, the XML development environment 26 includes an XSLT processor 30a for previewing an HTML document 32a (a document created by applying an XSLT stylesheet to an XML document), an XSL:FO processor 30b for previewing a PDF document 32b (a document created by applying an XSL:FO stylesheet to the XML document), an WML processor 30c for previewing a WML document 32c (a document created by applying a WML stylesheet to the XML document), and so forth. In the transformation process, according to instructions in the given XSLT stylesheet, the given processor 30 selects content from a data source (e.g., an XML document) and places it in the output document template, which is designed within a main output window as will be seen below. The selected content is usually placed as element content or as an attribute value. If the output document is intended for rendering on some output medium or as part of a processing chain that produces a document to be rendered, then the stylesheet can also be used to add presentation properties to the output document. As is well-known, the instructions for content selection, processing, placement, and formatting are all contained in the stylesheet.

Figure 2:
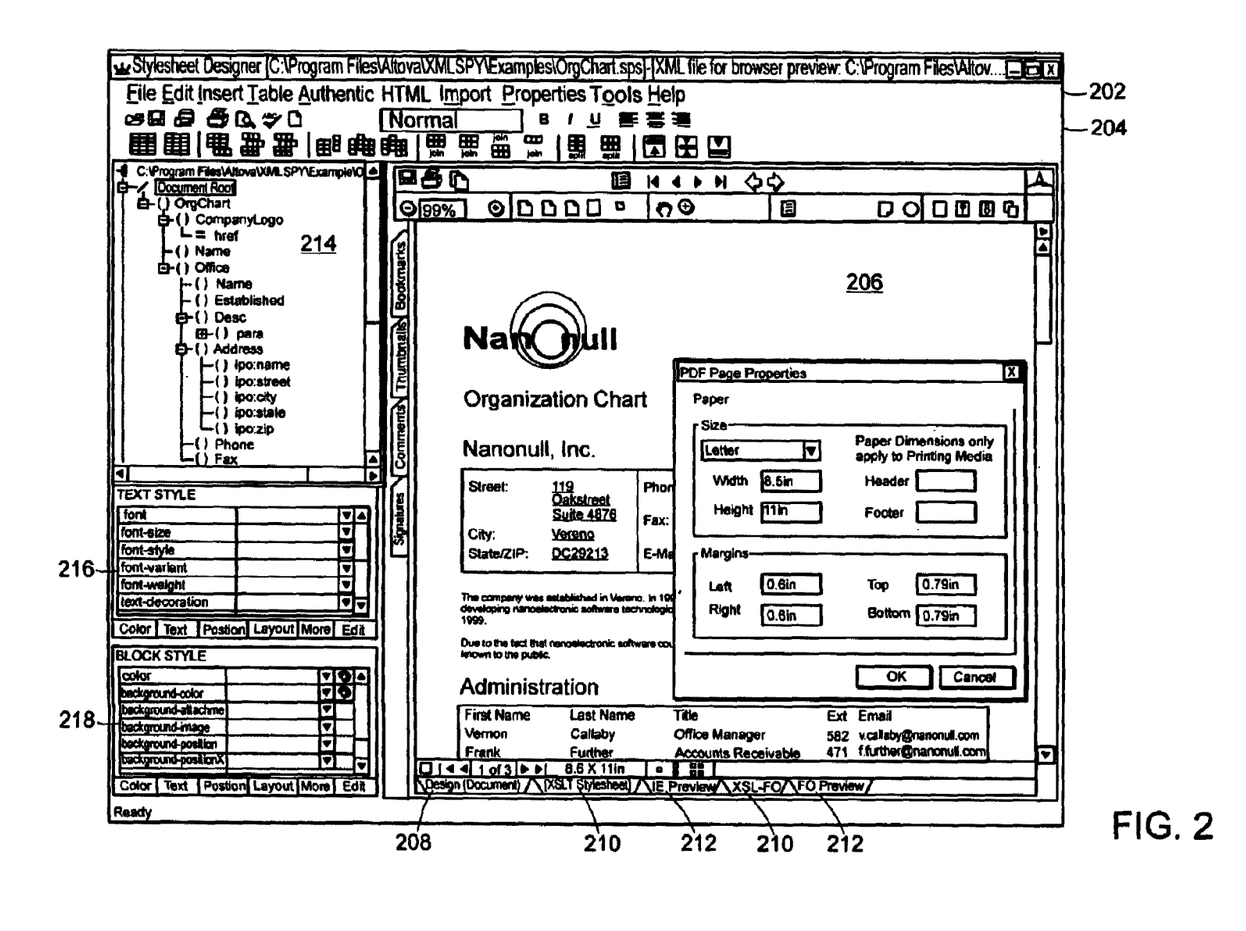
FIG. 2 is a simplified illustration of an integrated visual design environment in which multiple stylesheets may be created according to the present invention.

The visual design environment of the present invention enables the creation of multiple different types of stylesheets within a single visual workspace. FIG. 2 illustrates a representative graphical user interface 200 that includes the visual design environment comprising a number of graphical design elements. In a representative embodiment, the VDE comprises conventional control elements such as a menu bar 202 that contains a set of menus, and a toolbar 204 that contains icons for common commands. A main window 206 preferably includes a number of tabs. A design document tab 208 displays a document being designed together with its formatting. Dynamic components (i.e., content that comes from the XML document) preferably are displayed in terms of schema elements and attributes. Static components (e.g., images, non-XML text, etc.) preferably are actually displayed. Preferably, all components of the document are displayed with their formatting and layout properties. The main window 206 also includes a View Stylesheet tab 210 for each type of stylesheet format that may be created using the integrated visual design environment. Thus, in a representative example where the VDE is used to create both XSLT and XSL:FO stylesheets, there are two such tabs 210 with a first tab for viewing an XSLT stylesheet and a second tab for viewing an XSL:FO stylesheet. Preferably, the stylesheets are not editable in this display format. The main window also preferably includes a Preview tab 212 for each stylesheet format. Selecting the preview tab 212 preferably initiates a respective transformation process (using the underlying XSL processor), with the output of the transformation then displayed in the main window. Continuing with the above example, there are two such Preview tabs, one for the HTML output document, and one for the PDF output document.

To facilitate the stylesheet design process, the integrated visual design environment also includes a schema window 214 that preferably displays a tree representation of a data source in terms of, for example: its elements and attributes, a list of all elements attributes for which global templates are possible, and optionally a list of all page layout components for a given output format (e.g., PDF). As will be described, preferably elements and attributes are dragged from the schema window 214 and placed (i.e., dropped) at a required location in the design document. The VDE may also include a text style window 216, and a block style window 218. The text style window preferably has a set of tabs, each with different groups of text formatting properties (such as font-weight and font-style). When text of an element containing text is selected in the design document, text-formatting properties are applied to the text via the properties in the text style window 216. If desired, some text style properties may be available as icons in the toolbar. The block style window 218 preferably has a set of tabs, each with different groups of block formatting properties (such as spacing before and after a block). When a block component is selected in the design document, block-formatting properties are applied to the block via the properties in the block style window 218. If the selected design document component is not a block, preferably the block style window is disabled.

One of ordinary skill in the art will appreciate from the above description that the schema window 214 and the main window 206 facilitate an integrated visual design environment according to the present invention. The schema window 214 is a first display panel in which a data source is displayed, and the main window is a second display panel for displaying a document being designed from the data source. Typically, the data source is an XML document, however, this is not a limitation of the present invention. The data source may, alternatively, be a Document Type Definition (DTD), an XML Schema, a relational database, an Electronic Data Interchange (EDI) document, a Web service, or the like.

A representative document design process is now described. Preferably, a data source is used as a starting point. In a representative embodiment, the data source is an XML document whose structure is displayed in the schema window. This provides the structural outline of the XML document in terms of its elements and attributes, which are loaded into and then available from the VDE. As used herein, the XML document is sometimes referred to as a working XML file. Preferably, the structure of the working XML file is displayed as a tree in the schema window. A document outline is then created in the main window. In particular, (in this illustrative example) XML content is selected by dragging an element or attribute from the schema tree. The dragged element/attribute is placed in the design document. The position where the element/attribute is dropped determines the location of that particular element/attribute in the design document. Because the actual content comes from the XML document and may vary depending on the XML content of the element/attribute, this type of content is known as dynamic content; its containing component is known as a dynamic component.

The above-described process creates what is sometimes referred to herein as a "meta" stylesheet, as this stylesheet is useful as a source of two or more output stylesheets (such as a first XSLT stylesheet through which an XML document or other data source is rendered in HTML, a second XSLT stylesheet through which the XML document or other data source is rendered in WML, and so forth). The meta stylesheet typically is an internal data representation that can be saved in a given file format (e.g., an .sps format). Typically, the meta stylesheet may (but need not) conform with the XSLT programming language. According to the invention, the visual design environment includes code for generating, from the meta stylesheet, two or more stylesheets that are themselves useful in rendering the data source in two or more respective output formats using the respective stylesheets. As noted above, each of the stylesheets generated from the meta stylesheet may be previewed using the View Stylesheet tab, and (if an appropriate transformation engine is available) the output document rendered through that stylesheet may be viewed through the Preview tab.

Figure 3:
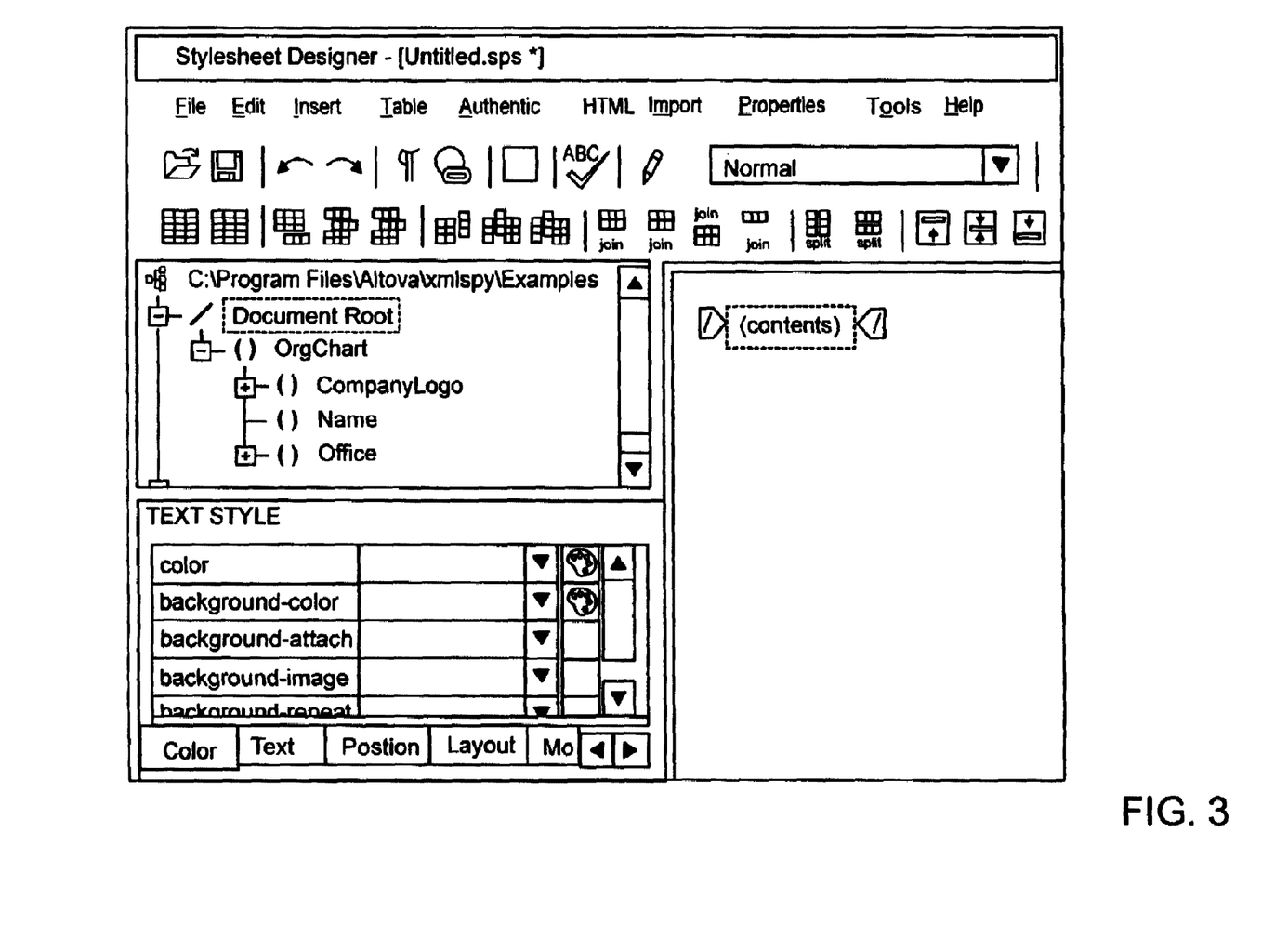
FIG. 3 illustrates a representative display of the visual design environment after the designer selects a schema.
Figure 4:
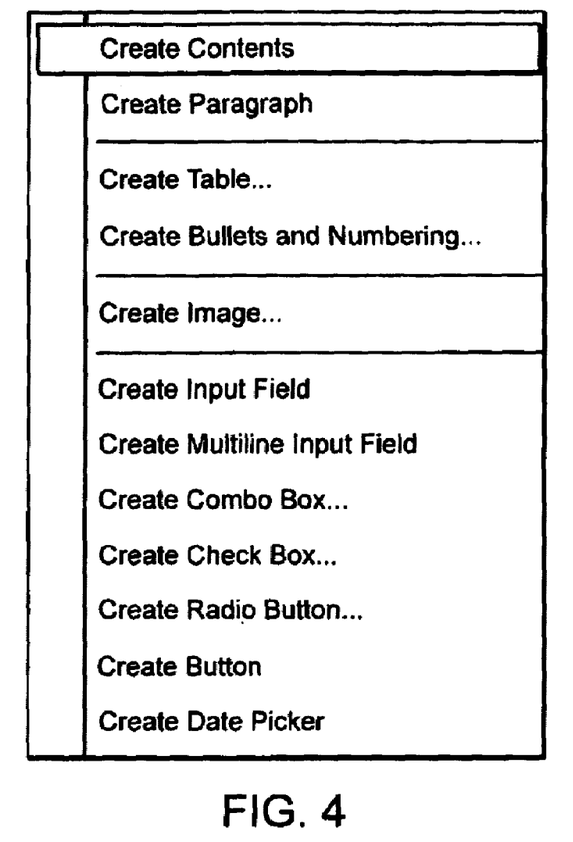
FIG. 4 illustrates a popup menu that may be used by a designer to create a document outline in the design view.

The following provides a more specific design example. In particular, a representative document design begins by having the designer select a schema. FIG. 3 illustrates a representative display. This schema creates a tree of the OrgChart (Organization Chart) schema in the VDE schema window, as well as entries for global templates and page layout features below the schema tree. In this example, a (contents) placeholder for a root element is also created in the design document output window. A working XML file preferably is used to preview how an XML file based on the selected schema will be processed by the meta stylesheet. As noted above, the inventive VDE preferably provides a set of two or more previews of the working XML file so that the designer can see how the meta stylesheet will process the XML. To assign a working XML file, the designer navigates using the appropriate control menus and selects a given XML file, such as NanonullOrg.xml, which is from a given folder. The working XML file, including its path, appears in the title bar. The user can then create a document outline in the design view as follows. In the schema window, the user expands the OrgChart element. The user then selects the /OrgChart/Name element and drags it in the design window. Preferably, this element is then positioned just after the (contents) placeholder. A blinking cursor preferably appears after the (contents) placeholder, and the dragged element becomes an arrow. When the mouse button is released, preferably a popup menu appears such as illustrated in FIG. 4.

Figure 5:
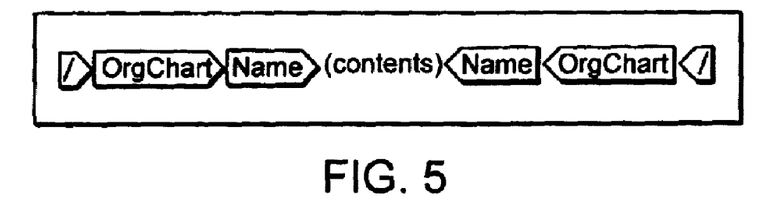
FIG. 5 illustrates the design document in the visual design environment after the designer selects a given Create Contents option in the menu of FIG. 4.

Assume now that the user selects the Create Contents option in the menu. The design document now looks as illustrated in FIG. 5. The Name element with a (contents) placeholder is inserted. The (contents) placeholder represents the content of the Name element. When the XML file is processed with this meta stylesheet, the XML content of the Name element will be displayed.

Figure 6:
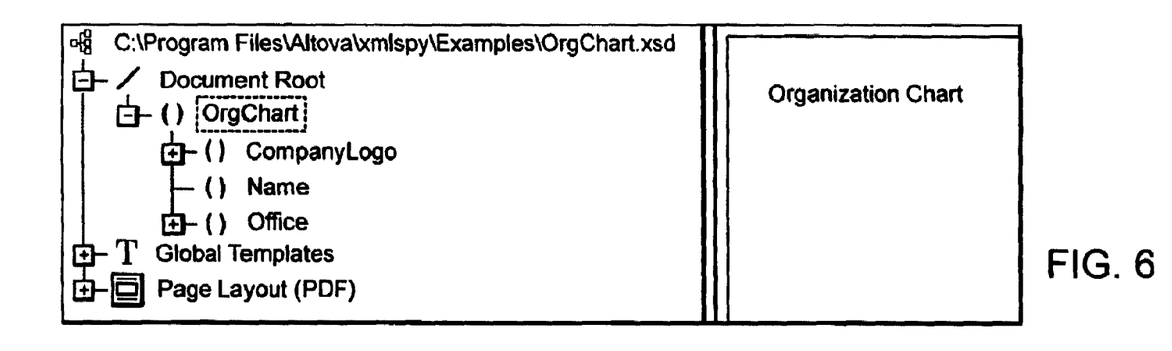
FIG. 6 illustrates an HTML preview of the document being designed.
Figure 7:
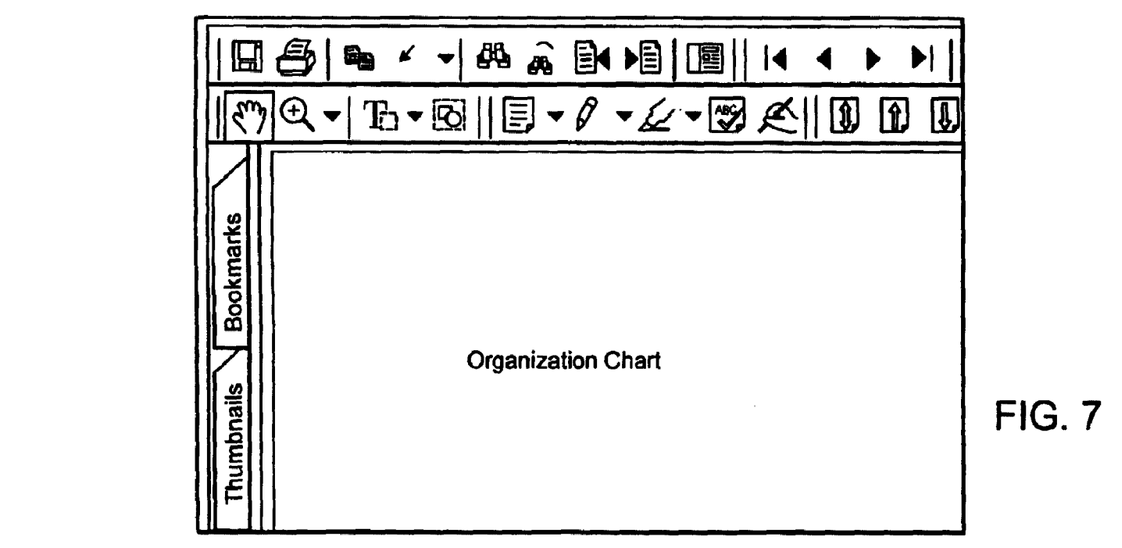
FIG. 7 illustrates a PDF preview of the document being designed.

The user can preview the XML file in the manner previously described. The HTML preview provides an accurate preview of HTML output such as illustrated in FIG. 6. A PDF preview is illustrated in FIG. 7.

The XSLT stylesheet for the HTML output format is illustrated below (©2003 Altova GmbH):

```
<?xml version="1.0" encoding="UTF-8"?>
<xsl:stylesheet version="1.0"
xmlns:xsl="http://www.w3.org/1999/XSL/Transform"
xmlns:n1="http://www.xmlspy.com/schemas/orgchart"
xmlns:ipo="http://www.altova.com/IPO"
xmlns:xsi="http://www.w3.org/2001/XMLSchema-instance">
    <xsl:template match="/">
```

-continued

```
<html>
    <head />
    <body>
        <xsl:for-each select="n1:OrgChart">
            <xsl:for-each select="n1:Name">
                <xsl:apply-templates />
            </xsl:for-each>
        </xsl:for-each>
    </body>
</html>
</xsl:template>
</xsl:stylesheet>
```

The stylesheet for the PDF output format is illustrative below (©2003 Altova GmbH):

```
<?xml version="1.0" encoding="UTF-8"?>
<xsl:stylesheet version="1.0"
xmlns:xsl="http://www.w3.org/1999/XSL/Transform"
xmlns:fo="http://www.w3.org/1999/XSL/Format"
xmlns:n1="http://www.xmlspy.com/schemas/orgchart"
xmlns:ipo="http://www.altova.com/IPO"
xmlns:xsi="http://www.w3.org/2001/XMLSchema-instance">
    <xsl:variable name="fo:layout-master-set">
        <fo:layout-master-set>
            <fo:simple-page-master master-name="default-page"
                page-height="11in" page-width="8.5in"
                margin-left="0.6in" margin-right="0.6in">
                <fo:region-body margin-top="0.79in"
                    margin-bottom="0.79in" />
            </fo:simple-page-master>
        </fo:layout-master-set>
    </xsl:variable>
    <xsl:template match="/">
        <fo:root>
            <xsl:copy-of select="$fo:layout-master-set" />
            <fo: page-sequence master-reference="default-page"
                initial-page-number="1" format="1">
                <fo:flow flow-name="xsl-region-body">
                    <fo:block>
                        <xsl:for-each select="n1:OrgChart">
                            <xsl:for-each select="n1:Name">
                                <xsl:apply-templates />
                            </xsl:for-each>
                        </xsl:for-each>
                    </fo:block>
                </fo:flow>
            </fo:page-sequence>
        </fo:root>
    </xsl:template>
</xsl:stylesheet>
```

As noted above, according to the present invention the visual design environment includes code for generating these distinct stylesheets (preferably from the meta stylesheet, although this intermediate step is not necessarily required) that render the data source to a particular output format (HTML and PDF in the given example). The generated stylesheets can then be saved by selecting an appropriate menu command. Although not shown in detail, these stylesheets may then be exported for use in the data processing system or elsewhere in a conventional manner.

Figure 8:
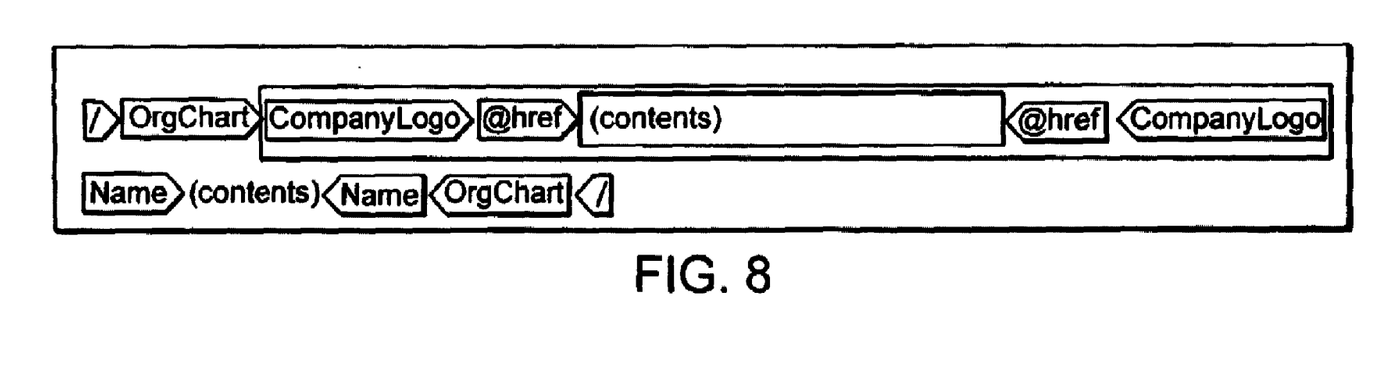
FIG. 8 illustrates a representative design document of FIG. 5 after including an attribute as a data-entry device.
Figure 9:
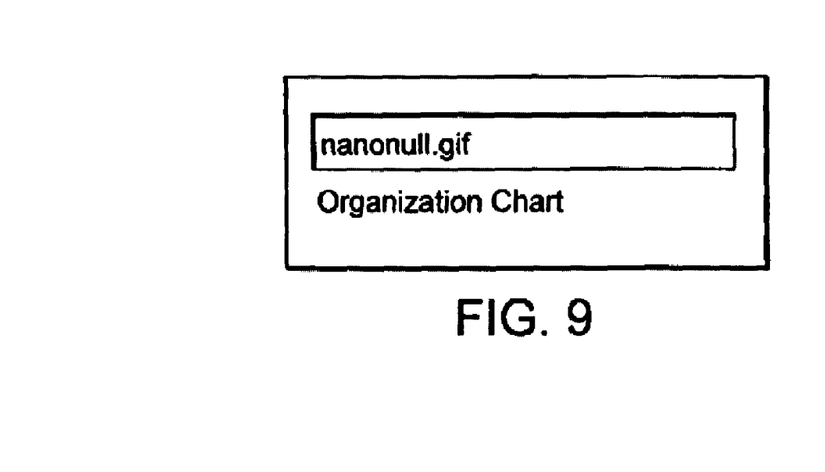
FIG. 9 illustrates an HTML preview of the design document of FIG. 8.

As noted above, given element and attributes values may be included in the design document using the simple interface. Continuing with the example illustrated in FIG. 5, assume that the element CompanyLogo (as shown in the XML) has an href attribute, the value of which gives the location of the logo image. Assume it is also desired to have specified what image should be used as the logo. In such case, the designer can create the href attribute as an input field, and the location of the image can be entered. To accomplish this, in the schema window, the designer places a cursor between start tags of OrgChart and Name, and presses an Enter key or command to put the Name element on a next line. An href attribute is then dragged from the schema window into the design document (the main window). In this example, this attribute is dropped just after the OrgChart start tag. As a result, a popup menu (such as illustrated in FIG. 3) again appears and the designer (in this example) selects "Create Input Field". The design document then looks as indicated in FIG. 8. FIG. 9 illustrates the HTML preview for the document at this point in the design process. In this example, the href attribute has been created as an input field, while the Name element was created as (contents).

Although not illustrated in detail, one of ordinary skill will appreciate that the text and style blocks as well as other appropriate GUI commands and controls are included to facilitate production of the design document such as, among other things, including images, formatting the components, specifying text style properties, inserting tables, modifying table properties, inserting bookmarks and links, using conditional templates, and the like. Thus, for example, the processing of element content preferably is defined in the design document in the same way as the processing of attribute values is: drag the element from the schema tree, drop it into the design document as a component (of the meta stylesheet), specify further XSLT/Xpath processing, and apply a required formatting. As noted above, formatting can be applied to a stylesheet component using the text formatting and block formatting windows. Text formatting typically is applied to text, and it typically includes font sizes, font weights, and font colors. Block formatting typically is applied to components that have been explicitly defined as blocks, and include background colors for the block, spacing around the block, and borders for the block. A component can be explicitly defined as a block by assigning it a predefined format. To apply formatting to a component, preferably the following mechanisms may be used, either alone or in combination: applying a predefined format, applying text style properties, and/or applying block style properties.

A skilled artisan will appreciate that the present invention provides numerous advantages over the prior art. According to the invention, a unified visual design environment automatically produces a plurality of stylesheets for different output formats, preferably without any external authoring tool. With prior art systems, if a designer wants to target a particular output format, he or she typically has to open a given HTML file, associate all elements from an XML tree, and then generate a stylesheet for use in that output format. He or she then has to do the same process all over again to target another output format (e.g., WML). These prior art approaches also typically require an external visual design tool to create the HTML page in the first place.

Variants

While the present invention has been described in the context of a visual design environment that includes a drag-and-drop interface, this is not a requirement of the invention. One of ordinary skill will appreciate that other techniques may be used to associate information from the data source representation into the output document format. Illustrative techniques include a clipboard, keyboard entry, an OLE data transfer mechanism, or the like.

The particular orientation of the schema window, the main window and/or the text style and block style windows illustrated in FIG. 2 are not meant be taken to limit the present invention. The visual design environment may juxtapose the schema window and the main window to facilitate the drag-and-drop functionality in any convenient visual orientation or alignment.

The principles of the present invention may also be generalized. As noted above, the "data source" from which the meta stylesheet is designed is not limited to an XML document. Various alternative data sources include, as noted above, an XML Schema, a DTD, a relational (or other structured) database, an EDI document, a Web service, or the like. In addition, one of ordinary skill will also appreciate that the XSLT stylesheets created by the invention may be generalized as any program code that renders the desired data (from the data source) to a particular output format. Thus, while an illustrative embodiment of the invention creates multiple XSLT stylesheets, this is not a limitation. The program code that renders the data to a particular output format may be generalized as any code written in a program language and selected from a set of available language templates including XSLT and others, such as: Java code, C# code, C++ code, Javascript, PHP, Perl, or any other convenient format. In this case the "meta" program code thus forms a superset, with the subset of this program code including the XSLT stylesheets described in the illustrative embodiment. A particular XSLT stylesheet may thus be considered an "instance" (e.g., a "version" or a "derivative") of the meta program code. The present invention thus provides a visual design tool that allows a designer or other user to generate multiple output formats from a single data source through an integrated visual design environment that (as an intermediate step) selectively generates an appropriate program code instance (a given XSLT stylesheet, given Java code, given C# code, etc.) that renders the data to the particular output format.

The invention claimed is:

1. In a data processing system having a windows-based graphical user interface (GUI) a computer-implemented method comprising:
    an integrated visual design environment (VDE) comprising a structured data source display panel including a structured data source having design elements and attributes and a document design display panel for displaying a document being designed from the structured data source displayed in the structured data source display panel, the structure data source display panel and the document design display panel displayed simultaneously;
    dragging and dropping selected design elements or attributes from the structured data source in the structured data source display panel to the document in the document design display panel to generate a meta stylesheet; and
    generating two or more stylesheets within the VDE from the meta stylesheet, each of the stylesheets useful for generating the document being designed in a given output format.

2. The computer-implemented method of claim 1 further comprising:
    displaying a preview of the two or more stylesheets.

3. The computer-implemented method of claim 1 wherein the structured data source is an extensible markup language (XML) document.

4. The computer-implemented method of claim 1 wherein the structured data source is a Document Type Definition (DTD).

5. The computer-implemented method of claim 1 wherein the structured data source is an XML Schema.

6. The computer-implemented method of claim 1 wherein the structured data source is a relational database.

7. The computer-implemented method of claim 1 wherein the structured data source is an Electronic Data Interchange (EDI) document.

8. The computer-implemented method of claim 3 wherein the two or more stylesheets include an Extensible Stylesheet Language Transformations (XSLT) stylesheet for transforming the XML document into hypertext markup language (HTML).

9. The computer-implemented method of claim 3 wherein the two or more stylesheets include an XSLT stylesheet to faciliate transformation of the XML document into portable document format (PDF) via Extensible Stylesheet Language Formatting Objects (XSL:FO).

10. The computer-implemented method of claim 3 wherein the two or more stylesheets include an XSLT stylesheet for transforming the XML document into wireless markup language (WML).

11. The computer-implemented method of claim 1 wherein the integrated visual design environment further comprises a manipulation display panel for manipulating schema elements and attributes.

12. The computer-implemented method of claim 11 wherein the manipulation display panel for manipulating schema elements and attributes includes a text style display window and an associated control mechanism to provide text formatting.

13. The computer-implemented method of claim 11 wherein the manipulation display panel for manipulating schema elements and attributes includes a block system display window and an associated control mechanism to provide block formatting.

14. The computer-implemented method of claim 1 further comprising:
    selectively displaying a preview of an output document rendered as a result of applying a given one of the two or more stylesheets to a user-supplied document or data.

15. A data processing system having a windows-based graphical user interface (GUI), comprising:
    an integrated visual design environment (VDE) display having a structured data source display panel in which a structured data source is displayed, and a document design display panel for displaying a document being designed from the structured data source in the structured data source display panel, the structure data source display panel and the document design display panel displayed simultaneously, the data source selected from a set of data sources comprising an extensible markup language (XML) document, an XML schema, a Document Type Definition (DTD), an Electronic Data Interchange (EDI) document, a relational database, and a Web service;
    dragging and dropping selected design elements or attributes from the structured data source in the structured data source display panel to the document in the document design display panel to generate program code; and
    automatically generating two or more program code instances within the integrated visual design environment from the program code, the program code instances useful for generating the document being designed in a given output format.

16. The data processing system of claim 15 wherein a given program code instance is an XSLT stylesheet.

17. The data processing system of claim 15 wherein a given program code instance is code written in a programming language selected from a set of available language templates.

18. The data processing system of claim 15 further comprising:
 selectively displaying a preview of a given one of the program code instances.

19. The data processing system of claim 15 further comprising:
 selectively displaying a preview of an output document rendered as a result of applying a given one of the program code instances.

20. A display method operative in a data processing system having a windows-based graphical user interface (GUI), comprising:
 displaying both a structured data source and a document being designed from the structured data source simultaneously in a single integrated visual design environment (VDE), the structured data source selected from a set of data sources comprising an extensible markup language (XML) document, an XML schema, a Document Type Definition (DTD), an Electronic Data Interchange (EDI) document, a relational database, and a Web service;
generating program code responsive to dragging and dropping selected design elements or attributes from the structured data source to the document being designed;
automatically generating two or more program code instances from the program code, the program code instances useful for generating the document being designed in a given output format; and
selectively displaying a preview of an output document rendered as a result of applying a one of the program code instances.

\* \* \* \* \*